United States Patent
Yamashita

(10) Patent No.: US 12,066,060 B2
(45) Date of Patent: Aug. 20, 2024

(54) SINTERED METAL CONNECTING ROD

(71) Applicant: NTN CORPORATION, Osaka (JP)

(72) Inventor: Tomonori Yamashita, Aichi (JP)

(73) Assignee: NTN CORPORATION, Osaka (JP)

( * ) Notice: Subject to any disclaimer, the term of this patent is extended or adjusted under 35 U.S.C. 154(b) by 136 days.

(21) Appl. No.: 17/439,554

(22) PCT Filed: Feb. 26, 2020

(86) PCT No.: PCT/JP2020/007857
§ 371 (c)(1),
(2) Date: Sep. 15, 2021

(87) PCT Pub. No.: WO2020/195498
PCT Pub. Date: Oct. 1, 2020

(65) Prior Publication Data
US 2022/0154764 A1    May 19, 2022

(30) Foreign Application Priority Data

Mar. 28, 2019   (JP) ................... 2019-063164

(51) Int. Cl.
*F16C 7/02*   (2006.01)
*B22F 3/06*   (2006.01)
(Continued)

(52) U.S. Cl.
CPC ............ *F16C 7/02* (2013.01); *F16C 9/04* (2013.01); *B22F 3/03* (2013.01); *B22F 3/16* (2013.01);
(Continued)

(58) Field of Classification Search
CPC .... F16C 7/02; F16C 7/023; F16C 9/04; F16C 2202/02; F16C 2220/08; F16C 2220/20; B22F 3/03; B22F 3/16; B22F 5/008
See application file for complete search history.

(56) References Cited

U.S. PATENT DOCUMENTS 7,096,756 B2*  8/2006  Ratzi ............... F16C 7/023
                                                74/579 R
8,596,187 B2* 12/2013  Nommensen ....... B21D 3/16
                                                74/579 E
(Continued)

FOREIGN PATENT DOCUMENTS

CN      102922291 A  *  2/2013
CN      203611011       5/2014
(Continued)

OTHER PUBLICATIONS

Angle of parallelism; https://en.wikipedia.org/wiki/Angle_of_parallelism; Obtained on Jun. 26, 2023 (Year: 2023).*

(Continued)

*Primary Examiner* — Adam D Rogers
(74) *Attorney, Agent, or Firm* — Wenderoth, Lind & Ponack, L.L.P.

(57) ABSTRACT

A sintered metal connecting rod (10) includes as an integrated body, a large end portion (11), a small end portion (12), and a stem portion (13). In the sintered metal connecting rod (10), division marks (14a, 14b) of a molding die by a compression molding are formed between the large end portion (11) and the stem portion (13) and between the small end portion (12) and the stem portion (13) on one of front and back surface (11c to 13c) in which the through-holes (11a, 12a) are formed, respectively. The large end portion (11) and the stem portion (13) have a density difference of 4% or less, and the small end portion (12) and the stem portion (13) have a density difference of 4% or less.

4 Claims, 2 Drawing Sheets

(51) Int. Cl.
  B22F 3/16 (2006.01)
  F16C 9/04 (2006.01)
  B22F 3/03 (2006.01)

(52) U.S. Cl.
  CPC ...... *F16C 2202/02* (2013.01); *F16C 2220/08* (2013.01); *F16C 2220/20* (2013.01)

(56) References Cited

U.S. PATENT DOCUMENTS

| | | | |
|---|---|---|---|
| 10,718,370 B2 * | 7/2020 | Yamashita | F16C 9/04 |
| 10,718,371 B1 * | 7/2020 | Yamashita | F16C 35/067 |
| 2007/0261514 A1 | 11/2007 | Geiman et al. | |
| 2010/0236401 A1 | 9/2010 | Nommensen et al. | |
| 2014/0345418 A1 * | 11/2014 | Junior | F16C 7/023 |
| | | | 74/579 R |
| 2018/0274583 A1 | 9/2018 | Yamashita et al. | |

FOREIGN PATENT DOCUMENTS

| | | | | |
|---|---|---|---|---|
| DE | 11 2017 001 636 | | 12/2018 | |
| JP | 53-23809 | | 3/1978 | |
| JP | 63176811 | A * | 7/1988 | |
| JP | 2004018958 | A * | 1/2004 | |
| JP | 2007-284769 | | 11/2007 | |
| JP | 2008-272780 | | 11/2008 | |
| JP | 2009-533626 | | 9/2009 | |
| JP | 2011-156571 | | 8/2011 | |
| JP | 2017-62015 | | 3/2017 | |
| JP | 2017187173 | A * | 10/2017 | |
| JP | 2018-53278 | | 4/2018 | |
| JP | 2018053278 | A * | 4/2018 | |

OTHER PUBLICATIONS

Phi; https://en.wikipedia.org/wiki/Phi; Obtained on Jun. 26, 2023 (Year: 2023).*
Machine translation of JP 2018-53278 A obtained on Jun. 26, 2023.*
Machine translation of JP 2011-156571 A obtained on Jun. 26, 2023.*
Machine translation of CN 203611011 U obtained on Jul. 5, 2023.*
Notice of Reasons for Refusal issued Jan. 23, 2023 in corresponding Japanese Patent Application No. 2019-063164, with English translation.
International Preliminary Report on Patentability and Written Opinion of the International Searching Authority issued Sep. 28, 2021 in International (PCT) Application No. PCT/JP2020/007857.
International Search Report issued Apr. 21, 2020 International (PCT) Application No. PCT/JP2020/007857.
Extended European Search Report issued Dec. 23, 2022 in corresponding European Patent Application No. 20779186.4.

* cited by examiner

SINTERED METAL CONNECTING ROD

TECHNICAL FIELD

The present invention relates to a connecting rod (hereinafter referred to as "connecting rod") configured to couple a crankshaft and a piston of an engine to each other, and more particularly, to a sintered metal connecting rod.

BACKGROUND ART

The connecting rod comprises, as an integrated body, for example, a large end portion to be coupled to a crankshaft of an automobile engine through intermediation of a bearing or the like, a small end portion to be coupled to a piston, and a stem portion configured to couple the large end portion and the small end portion to each other. As such a connecting rod, there has been known a sintered metal connecting rod that can be manufactured at low cost as compared to other processing methods (see, for example, Patent Literature 1). This type of connecting rod is manufactured, for example, through a compression molding step of subjecting metal powder to compression molding to obtain a green compact, a sintering step of sintering the green compact to obtain a sintered compact, and a sizing step of subjecting the sintered compact to sizing treatment (see, for example, Patent Literature 2).

CITATION LIST

Patent Literature

[PTL 1] 2007-284769 A
[PTL 2] 2017-62015 A

SUMMARY OF INVENTION

Technical Problem

Incidentally, when the connecting rod is formed through use of a sintered metal as described above, there is a problem in that the shape accuracy of the large end portion and the small end portion is lowered due to the strain caused by sintering. Specifically, when the compression molding is completed, a workpiece (green compact) is warped in an arch shape along a longitudinal direction thereof. This warpage (deformation) becomes more conspicuous due to the sintering. Here, it seems that the above-mentioned deformation can be eliminated through use of the sizing step after sintering as described in Patent Literature 2. However, in actuality, it is not easy to eliminate the above-mentioned warpage completely or sufficiently. When non-negligible warpage remains in the connecting rod, the parallelism between a through-hole of the large end portion and a through-hole of the small end portion which are positioned at both ends in a longitudinal direction of the connecting rod is increased, with the result that there is a risk in that premature abrasion caused by one-sided contact of the bearings to be used by being mounted to the through-holes and occurrence of abnormal noise caused by inclination of the piston may be caused.

In view of the above-mentioned circumstances, in this description, a technical object to be achieved is to provide a connecting rod which is capable of eliminating or suppressing warpage of a stem portion in a direction along a longitudinal direction and suppressing the abrasion and the occurrence of abnormal noise while obtaining a benefit of cost reduction trough use of a sintered metal.

Solution to Problem

The above-mentioned object can be achieved by a sintered metal connecting rod according to the present invention. That is, there is provided a sintered metal connecting rod obtained by subjecting metal powder to compression molding and sintering, comprising, as an integrated body: a large end portion and a small end portion each having an annular shape and each having a through-hole on an inner periphery; and a stem portion configured to couple the large end portion and the small end portion to each other, wherein division marks of a molding die by the compression molding are formed between the large end portion and the stem portion and between the small end portion and the stem portion on one of front and back surfaces in which the through-holes are formed, respectively, and wherein the large end portion and the stem portion have a density difference of 4% or less, and the small end portion and the stem portion have a density difference of 4% or less.

As described above, in the connecting rod according to the present invention, by the compression molding, the division marks of the molding die are formed between the large end portion and the stem portion and between the small end portion and the stem portion on one of the front and back surfaces in which the through-holes are opened. In the sintered metal connecting rod having such division marks formed thereon, it is understood that compression molding is performed through use of a molding die divided at the above-mentioned positions. The density of the sintered metal can be controlled by the relative compression amount of raw material powder at the time of compression molding. Accordingly, a connecting rod having a density difference between the large end portion and the stem portion of 4% or less and a density difference between the small end portion and the stem portion of 4% or less can be obtained, for example, by adjusting the compression amount of the raw material powder between the stem portion and the large end portion and between the stem portion and the small end portion individually and independently. When the above-mentioned density difference is 4% or less, the warpage of a compression molded body (green compact) can be suppressed, with the result that the warpage of the sintered compact can be suppressed. Accordingly, the parallelism between the through-hole of the large end portion and the through-hole of the small end portion can be reduced, and the premature abrasion caused by one-sided contact of the bearings to be mounted to the through-holes and the occurrence of abnormal noise caused by inclination of the piston can be prevented to the possible extent.

Further, in the sintered metal connecting rod of the present invention, the through-hole of the large end portion and the through-hole of the small end portion may have a parallelism of $\phi 0.5/100$ or less.

The parallelism as used herein is defined based on the criterion described below. That is, a center line of each of the through-holes is acquired based on coordinates measured at a plurality of points on inner peripheral surfaces of the through-hole of the large end portion and the through-hole of the small end portion. Then, an imaginary center line parallel to one of the center lines is assumed. The imaginary center line is extended by X mm (for example, 100 mm) from a state in which the imaginary center line is overlapped with the other center line on an inner periphery of the through-hole, and an imaginary circle having a diameter of Y mm (for example, 0.5 mm) is defined around a point on the imaginary center line positioned X mm ahead. When the other center line extended by X mm is included in the imaginary circle, the parallelism between the through-hole of the large end portion and the through-hole of the small end portion is assumed to fall within ϕY/X.

As described above, when the parallelism between the through-hole of the large end portion and the through-hole of the small end portion is set to ϕ0.5/100 or less, the assembling accuracy of components (bearings, pistons, and the like) to be mounted to the through-holes can be ensured. Accordingly, the performance of a connecting rod module obtained by mounting those components to the connecting rod can be ensured, and the premature abrasion of the bearings and the occurrence of abnormal noise can be reliably prevented.

In addition, the sintered metal connecting rod described in the foregoing can suppress the abrasion and the occurrence of abnormal noise through reduction in parallelism between the through-hole of the large end portion and the through-hole of the small end portion while obtaining the benefit of cost reduction through use of the sintered metal. Thus, for example, there can be suitably provided a connecting rod module comprising the above-mentioned sintered metal connecting rod and a bearing raceway ring fitted, with an interference, into at least one of the through-hole of the large end portion and the through-hole of the small end portion of the sintered metal connecting rod.

Advantageous Effects of Invention

As described above, according to the present invention, there can be provided the connecting rod capable of suppressing the abrasion and the occurrence of abnormal noise through reduction in parallelism between the through-hole of the large end portion and the through-hole of the small end portion while obtaining the benefit of cost reduction through use of the sintered metal.

DESCRIPTION OF EMBODIMENTS

Now, an embodiment of the present invention is described with reference to the drawings.

Figure 1:
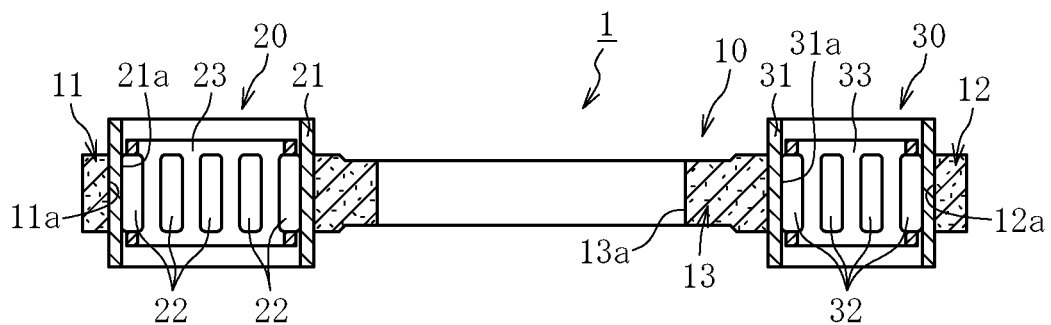
FIG. 1 is a sectional view of a connecting rod module.

A connecting rod module 1 according to one embodiment of the present invention is incorporated into an engine. For example, the connecting rod module 1 is incorporated into a small-sized engine (general-purpose engine) that has a displacement of 100 cc or less (specifically, a displacement of 50 cc or less) and is provided in a bush cutter, a blower, or the like. As illustrated in FIG. 1, the connecting rod module 1 comprises a connecting rod 10 and bearings 20 and 30.

Figure 2:
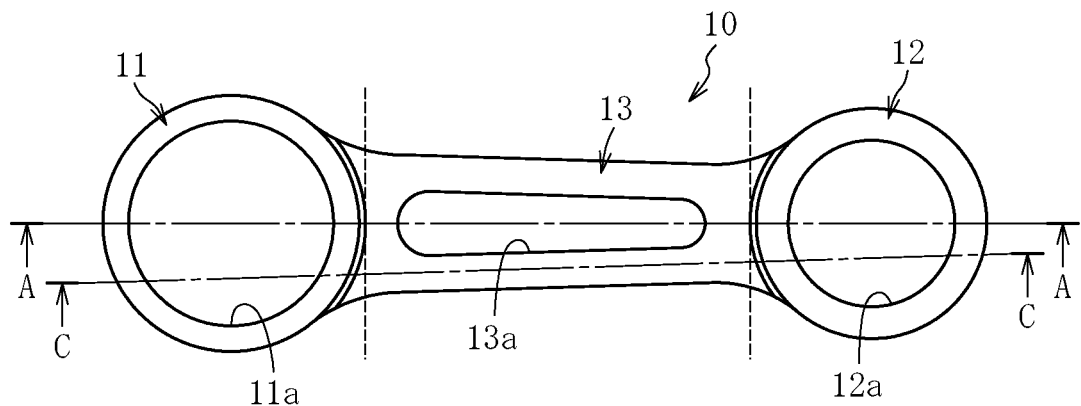
FIG. 2 is a plan view of a connecting rod illustrated in FIG. 1.
Figure 3:
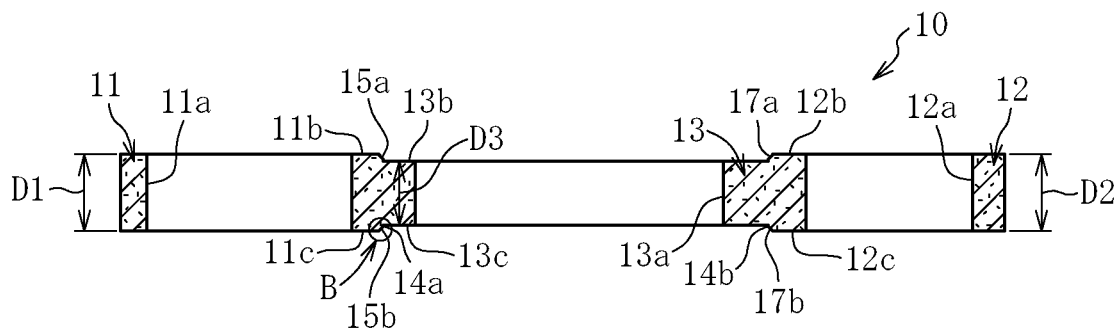
FIG. 3 is a sectional view taken along the line A-A of the connecting rod illustrated in FIG. 2.

As illustrated in FIG. 2 and FIG. 3, the connecting rod 10 integrally comprises a large end portion 11 and a small end portion 12, and a stem portion 13 coupling the large end portion 11 and the small end portion 12 to each other. Both the large end portion 11 and the small end portion 12 have an annular shape, and through-holes 11a and 12a are formed on inner peripheries of the large end portion 11 and the small end portion 12, respectively. An elongated through-hole 13a that is elongated in an extending direction (right-and-left direction of FIG. 1 to FIG. 3) of the stem portion 13 is formed in the stem portion 13. In the following, for convenience of description, the extending direction (right-and-left direction of FIG. 1 to FIG. 3) of the stem portion 13 of the connecting rod 10 is defined as a longitudinal direction, a center line direction (vertical direction of FIG. 1 and FIG. 3) of the through-holes 11a of the large end portion 11 and the small end portion 12 and the through-hole 12a of the small end portion 12 is defined as a thickness direction, and a direction (vertical direction of FIG. 2) orthogonal to the longitudinal direction and the thickness direction is defined as a width direction.

The connecting rod 10 having the above-mentioned configuration is formed of a sintered metal, and more specifically, is formed of an iron-based sintered metal containing iron as a main component (for example, containing 80 mass % or more, preferably 90 mass % or more of iron). The iron-based sintered metal is made of, for example, nickel-molybdenum steel, and specifically, for example, there can be given, as an example, a composition containing 0.1 mass % to 5 mass % (preferably 0.5 mass % to 4 mass %) of nickel, 0.1 mass % to 3 mass % (preferably 0.3 mass % to 2.5 mass %) of molybdenum, 0.05 mass % to 1 mass % (preferably 0.1 mass % to 0.5 mass %) of carbon, and the balance of iron. In addition, the composition of the sintered metal may be set so that the Young's modulus of the connecting rod 10 is 120 GPa or more and 180 GPa or less.

In addition, the density of the connecting rod 10 is set to, for example, 7.0 g/cm$^3$ or more, preferably 7.2 g/cm$^3$ or more. Meanwhile, it is appropriate that the density of the connecting rod 10 be set to, for example, 7.8 g/cm$^3$ or less, which is the ideal density of an ingot material, substantially 7.6 g/cm$^3$ or less in consideration of a powder pressing property and the like at the time of compression molding.

Here, both the density difference between the large end portion 11 and the stem portion 13 and the density difference between the small end portion 12 and the stem portion 13 are set to 4% or less, preferably 3% or less. In this case, it is appropriate that the density of the large end portion 11 and the density of the small end portion 12 be set to be as equal as possible. For example, it is appropriate that the density of the large end portion 11 be set to 7.2 g/cm$^3$ or more and 7.5 g/cm$^3$ or less, and that the density of the small end portion 12 be set to 7.2 g/cm$^3$ or more and 7.5 g/cm$^3$ or less. In addition, as described above, it is appropriate that the density of the stem portion 13 be set to 7.1 g/cm$^3$ or more and 7.5 g/cm$^3$ or less as long as the density difference between the large end portion 11 and the small end portion 12 is 4% or less.

In addition, the warpage of the connecting rod can be suppressed more effectively by suppressing both the density difference between the large end portion and the stem portion and the density difference between the small end portion and the stem portion to 3% or less, and hence the parallelism between the through-hole of the large end portion and the through-hole of the small end portion can be reduced more positively. Accordingly, a connecting rod of high quality can be stably provided while variations among products are suppressed. Further, in the case of a connecting rod formed so as to leave the above-mentioned division marks, it is also relatively easy to control the density of the large end portion, the small end portion, and the stem portion with the compression amount by a divided molding die, and hence the productivity can be ensured even when the density difference is set to 3% or less.

In this embodiment, a thickness direction dimension D3 of the stem portion 13 is smaller than any of a thickness direction dimension D1 of the large end portion 11 and a thickness direction dimension D2 of the small end portion 12 (see FIG. 3). In FIG. 3, an upper surface 13b of the stem portion 13 is positioned more closely to a center side (lower side in FIG. 3) in the thickness direction of the connecting rod 10 than any of an upper surface 11b of the large end portion 11 and an upper surface 12b of the small end portion 12. In addition, a lower surface 13c of the stem portion 13 is positioned more closely to the center side (upper side in FIG. 3) in the thickness direction than any of a lower surface 11c of the large end portion 11 and a lower surface 12c of the small end portion 12. In this case, the level difference between the upper surface 11b of the large end portion 11 or the upper surface 12b of the small end portion 12 and the upper surface 13b of the stem portion 13, and the level difference between the lower surface 11c of the large end portion 11 or the lower surface 12c of the small end portion 12 and the lower surface 13c of the stem portion 13 are each 1 mm or less, for example, about 0.5 mm.

In addition, as illustrated in FIG. 3, division marks 14a and 14b of a molding die 40 (see FIG. 5) by compression molding described later are formed between the lower surface 11c of the large end portion 11 in which the through-hole 11a is opened and the lower surface 13c of the stem portion 13 and between the lower surface 12c of the small end portion 12 in which the through-hole 12a is opened and the lower surface 13c of the stem portion 13, respectively.

Figure 4:
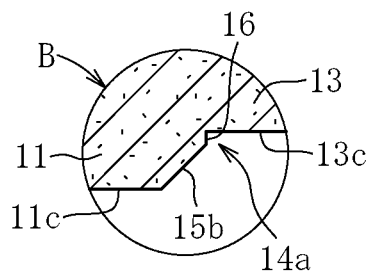
FIG. 4 is an enlarged view of a portion B of the connecting rod illustrated in FIG. 3.

In this embodiment, as illustrated in FIG. 4 in an enlarged manner, a lower inclined surface 15b is formed continuously with an end portion on the stem portion 13 side of the lower surface 11c of the large end portion 11, and a straight surface 16 is formed continuously with an end portion on the stem portion 13 side of the lower inclined surface 15b. The straight surface 16 extends linearly along the thickness direction and also extends in an arc shape along a peripheral edge of the large end portion 11, and is connected to the lower surface 13c of the stem portion 13 at an upper end thereof. The straight surface 16 forms the division mark 14a. Accordingly, in this case, the lower surface 11c of the large end portion 11 is connected to the lower surface 13c of the stem portion 13 through intermediation of the lower inclined surface 15b and the straight surface 16. In addition, the lower inclined surface 15b and the straight surface 16 forms a level difference (see FIG. 3) between the large end portion 11 and the stem portion 13. In addition, although not shown, a straight surface forming the division mark 14b is formed also between a lower inclined surface 17b on the small end portion 12 side and the lower surface 13c on the stem portion 13. Although the straight surface is also not shown, this straight surface also has the same shape as the straight surface 16 on the large end portion 11 side, and is connected to the lower surface 13c of the stem portion 13 at an upper end thereof. Accordingly, in this case, the lower surface 12c of the small end portion 12 is connected to the lower surface 13c of the stem portion 13 through intermediation of the lower inclined surface 17b and the straight surface. In addition, the lower inclined surface 17b and the straight surface form a level difference (see FIG. 3) between the small end portion 12 and the stem portion 13.

In this embodiment, the division marks 14a and 14b are formed only on the lower surface of the connecting rod 10, and are not formed on the upper surface of the connecting rod 10. Accordingly, the upper surface 11b of the large end portion 11 and the upper surface 13b of the stem portion 13 are connected to each other through intermediation of an upper inclined surface 15a. Accordingly, in this case, only the upper inclined surface 15a forms a level difference between the large end portion 11 and the stem portion 13. Further, the upper surface 12b of the small end portion 12 and the upper surface 13b of the stem portion 13 are connected to each other through intermediation of an upper inclined surface 17a. Accordingly, in this case, only the upper inclined surface 17a forms a level difference between the small end portion 12 and the stem portion 13.

The parallelism between the through-hole 11a of the large end portion 11 and the through-hole 12a of the small end portion 12 is set to $\phi 0.5/100$ or less, preferably $\phi 0.3/100$ or less. Meanwhile, the parallelism between the through-hole 11a of the large end portion 11 and the through-hole 12a of the small end portion 12 is set to $\phi 0.1/100$ or more, preferably $\phi 0.2/100$ or more from the viewpoint of the manufacturing ability and the like in the manufacturing process of the sintered metal connecting rod 10.

The bearing 20, for example, as illustrated in FIG. 1, comprises an outer ring 21, which serves as a bearing raceway ring having a raceway surface 21a formed into a cylindrical surface on an inner peripheral surface of the bearing raceway ring, a plurality of rollers 22 (needle rollers) accommodated along an inner periphery of the outer ring 21, and a cage 23 configured to retain the plurality of rollers 22 equiangularly. The bearing 30 has the same configuration as that of the bearing 20. The bearing 30 comprises an outer ring 31, which serves as a bearing raceway ring having a raceway surface 31a formed into a cylindrical surface on an inner peripheral surface of the bearing raceway ring, a plurality of rollers 32 (needle rollers) accommodated along an inner periphery of the outer ring 31, and a cage 33 configured to retain the plurality of rollers 32 equiangularly.

The outer rings 21 and 31 are each formed into, for example, a cylindrical shape, and are fitted and fixed (that is, press-fitted) with a predetermined interference in the through-hole 11a of the large end portion 11 and the through-hole 12a of the small end portion 12 of the connecting rod 10, respectively. The outer rings 21 and 31 are formed of a material having a Young's modulus higher than that of the connecting rod 10. Specifically, the outer rings 21 and 31 are formed of a material having a Young's modulus of more than 180 GPa. Meanwhile, when each of the outer rings 21 and 31 has extremely high Young's modulus, processing is difficult. Accordingly, it is appropriate that the Young's modulus of each of the outer rings 21 and 31 be set to 240 GPa or less.

The above-mentioned connecting rod 10 is manufactured through a compression molding step S1, a sintering step S2, and a sizing step S3. Now, each step is described in detail.

(S1) Compression Molding Step

Figure 5:
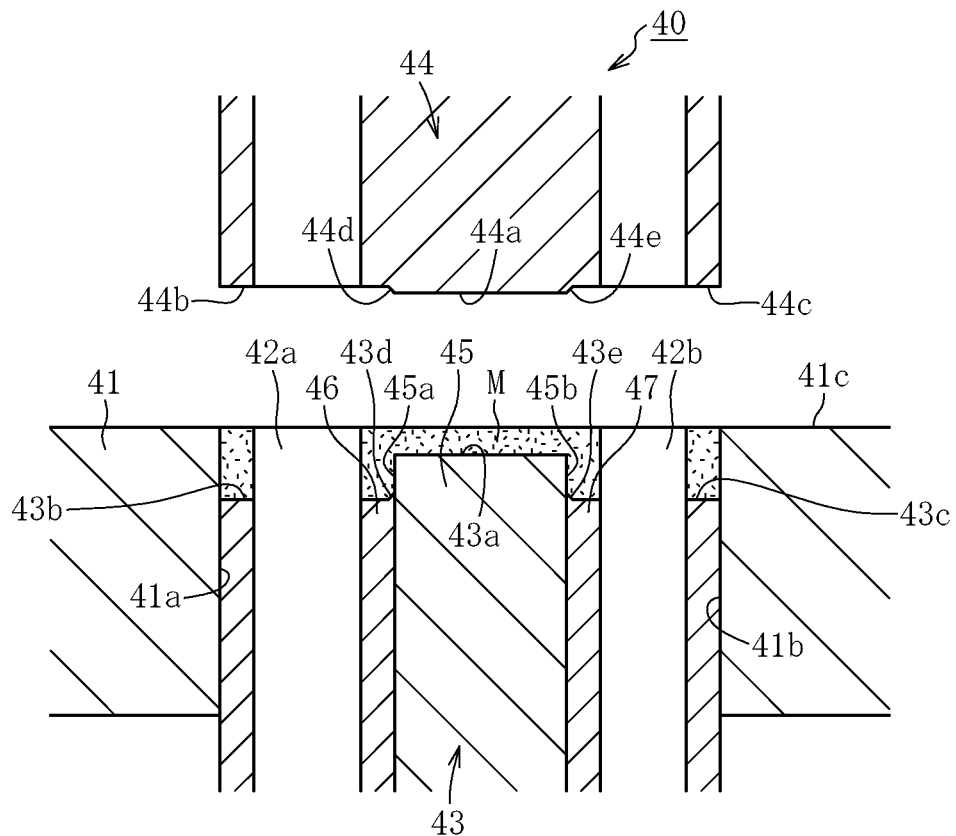
FIG. 5 is a sectional view of a molding die to be used in a compression molding step, corresponding to a portion taken along the line C-C of the connecting rod illustrated in FIG. 2 in a state in which raw material powder is filled.

In the compression molding step S1, raw material powder M containing metal powder as a main component is filled into a molding die 40 (see FIG. 5 in any case) and subjected to compression molding, to thereby mold a green compact 110 (see FIG. 6) having substantially the same shape as that of the connecting rod 10. In this embodiment, alloy powder of iron, nickel, and molybdenum having carbon powder (for example, graphite powder) and a lubricant (for example, metal soap) added thereto is used as the raw material powder M. Here, as illustrated in FIG. 5, the molding die 40 comprises a die 41, side cores 42a and 42b, a center core (not shown), a lower punch 43, and an upper punch 44. Of those, the side cores 42a and 42b correspond to the through-hole 11a of the large end portion 11 and the through-hole 12a of the small end portion 12, respectively, and the center core corresponds to the through-hole 13a of the stem portion 13.

On a lower surface of the upper punch 44, a first molding surface 44a corresponding to the upper surface 13b of the stem portion 13 of the connecting rod 10, a second molding surface 44b corresponding to the upper surface 11b of the large end portion 11, and a third molding surface 44c corresponding to the upper surface 12b of the small end portion 12 are formed. In addition, in this embodiment, a fourth molding surface 44d and a fifth molding surface 44e corresponding to the upper inclined surfaces 15a and 17a, respectively, are formed between the first molding surface 44a and the second molding surface 44b and between the first molding surface 44a and the third molding surface 44c, respectively. The first molding surface 44a of the upper punch 44 is positioned below the second molding surface 44b and the third molding surface 44c, and the first to fifth molding surfaces 44a to 44e are integrally formed on one upper punch 44.

On an upper surface of the lower punch 43, a first molding surface 43a corresponding to the lower surface 13c of the stem portion 13 of the connecting rod 10, a second molding surface 43b corresponding to the lower surface 11c of the large end portion 11, and a third molding surface 43c corresponding to the lower surface 12c of the small end portion 12 are formed. In addition, in this embodiment, a fourth molding surface 43d and a fifth molding surface 43e corresponding to the lower inclined surfaces 15b and 17b, respectively, are formed between the first molding surface 43a and the second molding surface 43b and between the first molding surface 43a and the third molding surface 43c, respectively, and a sixth molding surface and a seventh molding surface (not shown) corresponding to the straight surface 16 on the large end portion 11 side and the straight surface (not shown) on the small end portion 12 side, respectively, are formed between the fourth molding surface 43d and the first molding surface 43a and between the fifth molding surface 43e and the first molding surface 43a.

Here, the lower punch 43 is formed of a first split punch 45 having the first molding surface 43a, a second split punch 46 having the second molding surface 43b and the fourth molding surface 43d, and a third split punch 47 having the third molding surface 43c and the fifth molding surface 43e. The first to third split punches 45 to 47 can be driven individually and independently. With this, the timing of raising and lowering and the position in the vertical direction can be controlled independently. In FIG. 5, there is illustrated a state in which the raw material powder M is filled under a state in which the first molding surface 43a is positioned above the vertical position with respect to the second molding surface 43b and the third molding surface 43c at the time of completion of molding. In addition, when the lower punch 43 is formed of three split punches 45 to 47 as described above, the sixth molding surface is formed of a side surface 45a of the first split punch 45 on the second split punch 46 side, and the seventh molding surface is formed of a side surface 45b of the first split punch 45 on the third split punch 47 side.

The die 41 has a first molding surface 41a corresponding to an outer periphery of the connecting rod 10, specifically an outer peripheral surface of the large end portion 11, a second molding surface 41b corresponding to an outer peripheral surface of the small end portion 12, and a third molding surface (not shown) corresponding to an outer surface of the stem portion 13. In this case, an upper surface 41c of the die 41 serves as a mass regulating surface when the raw material powder M is filled.

Next, an example of the compression molding step S1 using the molding die 40 having the above-mentioned configuration is described. First, as illustrated in FIG. 5, the raw material powder M is filled into a cavity defined by the die 41, the side cores 42a and 42b, the center core (not shown), and the first to third split punches 45 to 47 serving as the lower punch 43. In this case, the first molding surface 43a serving as an upper surface of the first split punch 45 is set to a position lower than the upper surface 41c of the die 41, and is also set to a position higher than the second molding surface 43b serving as an upper surface of the second split punch 46 and the third molding surface 43c serving as an upper surface of the third split punch 47. More precisely, the first molding surface 43a is set to a position higher than the second molding surface 43b by the level difference between the large end portion 11 and the stem portion 13, and is also set to a position higher than the third molding surface 43c by the level difference between the small end portion 12 and the stem portion 13. In this state, the raw material powder M is filled so that the upper surface 41c of the die 41 serves as the mass regulating surface, with the result that the raw material powder M is filled into a region (cavity) sandwiched by the die 41, the side cores 42a and 42b, and the first to fifth molding surfaces 43a to 43e of the lower punch 43.

In this case, for example, the height position of each of the split punches 45 and 46 is set so that the ratio of a filling height of the raw material powder M on the first molding surface 43a to the thickness direction dimension D3 of the stem portion 13 to be molded by the first molding surface 43a (that is, the compression ratio of the stem portion 13) becomes smaller than the ratio of a filling height of the raw material powder M on the second molding surface 43b to the thickness direction dimension D1 of the large end portion 11 to be molded by the second molding surface 43b (that is, the compression ratio of the large end portion 11). In the same manner, the height position of each of the split punches 45 and 47 is set so that the compression ratio of the above-mentioned stem portion 13 becomes smaller than the ratio of a filling height of the raw material powder M on the third molding surface 43c to the thickness direction dimension D2 of the small end portion 12 to be molded by the third molding surface 43c (that is, the compression ratio of the small end portion 12).

Figure 6:
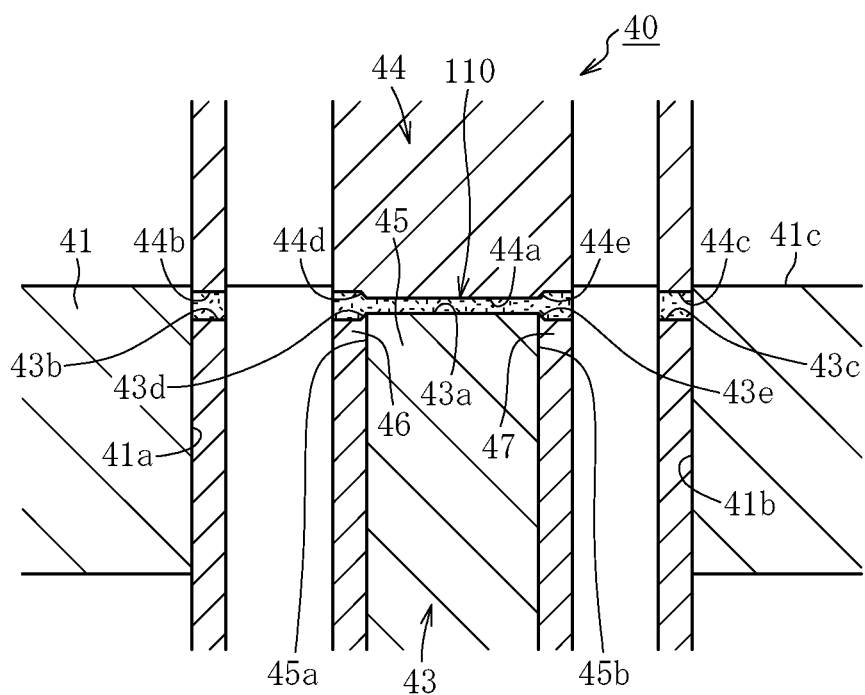
FIG. 6 is a sectional view of the molding die to be used in the compression molding step, corresponding to the portion taken along the line C-C of the connecting rod illustrated in FIG. 2 in a state in which the compression molding is completed.

Then, from the state illustrated in FIG. 5, the upper punch 44 is lowered, and the raw material powder M filled in the cavity is pushed in from above. As a result, as illustrated in FIG. 6, the raw material powder M on the first molding surface 43a is compressed by the first molding surfaces 43a and 44a of the upper and lower punches 43 and 44, and a portion corresponding to the stem portion 13 of the green compact 110 is molded. In addition, the raw material powder M on the second molding surface 43b and the fourth molding surface 43d is compressed by the second molding surfaces 43b and 44b and the fourth molding surfaces 43d and 44d of the upper and lower punches 43 and 44, and a portion corresponding to the large end portion 11 of the green compact 110 is molded. Further, the raw material powder M on the third molding surface 43c and the fifth molding surface 43e is compressed by the third molding surfaces 43c and 44c and the fifth molding surface 43e and 44e of the upper and lower punches 43 and 44, and a portion corresponding to the small end portion 12 of the green compact 110 is molded. With this, the molding of the green compact 110 having a shape in conformity with that of the connecting rod 10 is completed.

Incidentally, as in this embodiment, when the thickness direction dimension D3 of the stem portion 13 to be molded is smaller than the thickness direction dimension D1 of the large end portion 11 to be molded and the thickness direction dimension D2 of the small end portion 12 to be molded, the density of the portion corresponding to the stem portion 13 of the green compact 110 is liable to become higher than those of the portions corresponding to the large end portion 11 and the small end portion 12. In this regard, in this embodiment, the lower punch 43 of the molding die 40 was divided, and the height positions of the respective split punches 45 to 47 were adjusted individually. Thus, the compression ratio of the portion corresponding to the large end portion 11, the compression ratio of the portion corresponding to the small end portion 12, and the compression ratio of the portion corresponding to the stem portion 13 were adjusted to respective predetermined ratios. Specifically, the height position of each of the molding surfaces 43a to 43c at the time of filling and at the time of compression was adjusted so that the compression ratio of the portion corresponding to the stem portion 13 became smaller than those of the portion corresponding to the large end portion 11 and the portion corresponding to the small end portion 12. With this, both the density difference between the portion corresponding to the large end portion 11 of the green compact 110 and the portion corresponding to the stem portion 13 of the green compact 110 and the density difference between the portion corresponding to the small end portion 12 of the green compact 110 and the portion corresponding to the stem portion 13 of the green compact 110 can be suppressed to a predetermined ratio or less, specifically 4% or less (preferably 3% or less) which is the upper limit of an allowable range. The density of the portion corresponding to the large end portion 11, the density of the portion corresponding to the small end portion 12, and the density of the portion corresponding to the stem portion 13 are obtained, for example, by measuring the density of each of divided pieces obtained by cutting at positions indicated by the broken lines of FIG. 2.

When the green compact 110 is molded through use of the molding die 40 having the configuration illustrated in FIG. 5, the division mark 14a serving as a mold matching portion between the first split punch 45 and the second split punch 46 is formed between a portion corresponding to the lower surface 11c of the large end portion 11 of the obtained green compact 110 and a portion corresponding to the lower surface 13c of the stem portion 13 of the obtained green compact 110. Similarly, the division mark 14b serving as a mold matching portion between the first split punch 45 and the third split punch 47 is formed between a portion corresponding to the lower surface 12c of the small end portion 12 of the green compact 110 and a portion corresponding to the lower surface 13c of the stem portion 13 of the green compact 110. Both the division marks 14a and 14b are formed between portions corresponding to the lower inclined surfaces 15b and 17b and a portion corresponding to the lower surface 13c of the stem portion 13, respectively (see FIG. 4).

(S2) Sintering Step

Next, the above-mentioned green compact 110 is heated at a predetermined temperature for a predetermined period of time to obtain a sintered compact having substantially the same shape as that of the green compact 110. In this case, both the density difference between the portion corresponding to the large end portion 11 of the green compact 110 and the portion corresponding to the stem portion 13 of the green compact 110 and the density difference between the portion corresponding to the small end portion 12 of the green compact 110 and the portion corresponding to the stem portion 13 of the green compact 110 are 4% or less, and hence the situation in which deformation, such as warpage, of the green compact 110 is promoted by sintering can be prevented to the extent possible. In addition, at the time of sintering, a tray may be used in order to align the green compact 110 to be a workpiece. However, in a case in which the tray has a flat surface shape, when the green compact 110 to be a workpiece is placed on the tray, there is a risk in that deformation, such as warpage, may be promoted with its own weight due to a gap formed between the portion corresponding to the stem portion 13 and the tray. Regarding this point, for example, although not shown, the green compact 110 is aligned under a state of being sandwiched through use of a stepped tray capable of being brought into abutment against the portion corresponding to the stem portion 13 of the green compact 110, more preferably a pair of stepped trays, and is subjected to sintering treatment. Thus, strain of the sintered compact can be reduced.

(S3) Sizing Step

Next, the sintered compact is subjected to recompression treatment (sizing treatment) to correct the sintered compact, to thereby finish the sintered compact with predetermined shape accuracy. Although the description of a specific sizing die and a usage mode thereof is omitted here, in a sizing step, a die and upper and lower punches are brought close to each other in the vertical direction to recompress the sintered compact, to thereby correct the entire shape. Along with the correction, two cores corresponding to the through-holes 11a and 12a are arranged so as to stand, followed by recompression as described above, to thereby remold portions corresponding to the through-holes 11a and 12a. With this, the shape accuracy of the through-holes 11a and 12a, for example, the circularity is finished with predetermined accuracy. In this case, although not shown, the inclination of the cores at the time of sizing is suppressed by fixing a base end side (lower side) of each of the cores to a jig and holding the posture of each of the cores more firmly as compared to the related art. As a result, the correcting force of the sintered compact can be improved, and hence the deformation of the sintered compact can be suppressed more effectively. Through the above-mentioned steps, the connecting rod 10 illustrated in FIG. 2 and FIG. 3 is completed.

As described above, according to the sintered metal connecting rod 10 of the present invention, the density difference between the large end portion 11 and the stem portion 13 can be set to 4% or less and the density difference between the small end portion 12 and the stem portion 13 can be set to 4% or less. When the above-mentioned density difference is 4% or less, the warpage of the green compact 110 can be suppressed, with the result that the warpage of the sintered compact can be suppressed. Accordingly, the parallelism between the through-hole 11a of the large end portion 11 and the through-hole 12a of the small end portion 12 can be reduced, and the premature abrasion caused by one-sided contact of the bearings 20 and 30 to be mounted to the through-holes 11a and 12a and the occurrence of abnormal noise caused by inclination of the piston can be prevented to the extent possible.

In addition, as described in this embodiment, through use of the tray as described above in the sintering step S2, and/or through use of the recompression die having a configuration as described above in the sizing step S3 in addition to setting the molding die 40 to the above-mentioned configuration in the compression molding step S1, the sintered metal connecting rod 10 having a parallelism between the through-hole 11a of the large end portion 11 and the through-hole 12a of the small end portion 12 of ϕ0.5/100 or less, preferably ϕ0.3/100 or less can be obtained. In this way, when the parallelism between the through-hole 11a of the large end portion 11 and the through-hole 12a of the small end portion 12 is set to ϕ0.5/100 or less, the positioning accuracy of components to be mounted to the through holes 11a and 12a, specifically bearings 20 and 30 illustrated in FIG. 1 and pistons and crankshafts (not shown) to be coupled to the bearings 20 and 30 can be ensured. Accordingly, the performance of the connecting rod module 1 having these components mounted to the connecting rod 10 is ensured, and the premature abrasion of the bearings 20 and 30 and the occurrence of abnormal noise can be prevented more reliably.

In addition, as in this embodiment, when the straight surface 16 which extends linearly along the thickness direction and is connected to the lower surface 13c of the stem portion 13 at an upper end thereof is formed as the division mark 14a (14b), an upper surface corner portion of the second split punch 46 corresponding to the large end portion 11 (end portion of the fourth molding surface 43d for molding the lower inclined surface 15b) can be protected. Accordingly, the life of a mold can be extended, and the green compact 110 of stable quality, eventually the sintered metal connecting rod 10 can be mass-produced.

While one embodiment of the present invention has been described above, the sintered metal connecting rod according to the present invention is not limited to the above-mentioned mode. Needless to say, the present invention may adopt any configuration within the scope of the present invention.

For example, in the above-mentioned embodiment, as the division marks 14a and 14b of the molding die 40 by compression molding, there is illustrated the straight surface 16 which extends linearly along the thickness direction and is connected to the lower surface 13c of the stem portion 13 at an upper end thereof. However, needless to say, the present invention is not limited thereto. The division marks 14a and 14b may have any e form as long as the division marks 14a and 14b each appear as a mold matching portion on one of front and back surfaces of the sintered metal connecting rod 10 serving as a finished product.

In addition, in the above-mentioned embodiment, there is illustrated the case in which the height position of the first split punch 45 remains unchanged between the time of filling of the raw material powder M (FIG. 5) and the time of completion of compression molding (FIG. 6). However, needless to say, the present invention is not limited thereto. For example, the height position of the first split punch 45 at the time of compression molding may be moved in an upper or lower direction as compared to that at the time of filling of the raw material powder M. In short, as long as the raw material powder M is filled under a state in which the first molding surface 43a is positioned above the vertical position of the first molding surface 43a with respect to the second molding surface 43b and the third molding surface 43c at the time of completion of molding, the vertical position of each of the molding surfaces 43a to 43c can be suitably set.

REFERENCE SIGNS LIST 1 connecting rod module
10 sintered metal connecting rod
11 large end portion
12 small end portion
11a, 12a through-hole
11b, 12b upper surface
11c, 12c lower surface
13 stem portion
13a through-hole
13b upper surface
13c lower surface
14a, 14b division mark
15a, 17a upper inclined surface
15b, 17b lower inclined surface
16 straight surface
20, 30 bearing
21, 31 outer ring
21a, 31a raceway surface
22, 32 roller
23, 33 cage
40 molding die
41 die
42a, 42b side core
43 lower punch
43a first molding surface (lower surface of stem portion)
43b second molding surface (lower surface of large end portion)
43c third molding surface (lower surface of small end portion)
43d fourth molding surface (lower inclined surface of large end portion side)
43e fifth molding surface (lower inclined surface of small end portion side)
44 upper punch
44a first molding surface (upper surface of stem portion)
44b second molding surface (upper surface of large end portion)
44c third molding surface (upper surface of small end portion)
44d fourth molding surface (upper inclined surface of large end portion side)
44e fifth molding surface (upper inclined surface of small end portion side)
45 first split punch
46 second split punch
47 third split punch
110 green compact
M raw material powder

The invention claimed is:

1. A sintered metal connecting rod obtained by subjecting metal powder to compression molding and sintering, the sintered metal connecting rod comprising, as an integrated body:
   a first end portion and a second end portion each having an annular shape and each having a through-hole on an inner periphery, the first end portion being larger than the second end portion; and
   a stem portion configured to couple the first end portion and the second end portion to each other, wherein division marks of a molding die by the compression molding are formed between the first end portion and the stem portion and between the second end portion and the stem portion on one of front and back surfaces in which the through-holes are formed, respectively, wherein the first end portion and the stem portion have a density difference of 4% or less, and the second end portion and the stem portion have a density difference of 4% or less, wherein a density of the first end portion and a density of the second end portion are higher than a density of the stem portion, and wherein an outer diameter of the first end portion is larger than an outer diameter of the second end portion.

2. The sintered metal connecting rod according to claim 1, wherein the through-hole of the first end portion and the through-hole of the second end portion have a parallelism of 0.5/100 or less.

3. A connecting rod module comprising:
the sintered metal connecting rod of claim 2; and
a bearing raceway ring fitted, with an interference, into at least one of the through-hole of the first end portion and the through-hole of the second end portion of the sintered metal connecting rod.

4. A connecting rod module comprising:
the sintered metal connecting rod of claim 1; and
a bearing raceway ring fitted, with an interference, into at least one of the through-hole of the first end portion and the through-hole of the second end portion of the sintered metal connecting rod.

* * * * *